No Printed Specification Available
3739X
J. Bazin, Jr.
Loom Temple.
No
Patented Aug. 8, 1823.
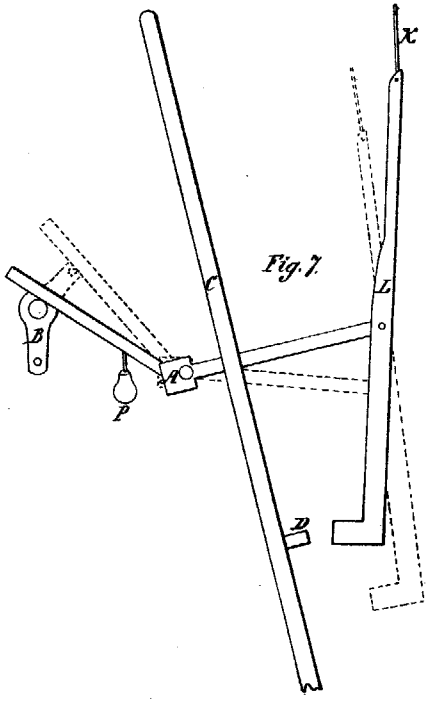
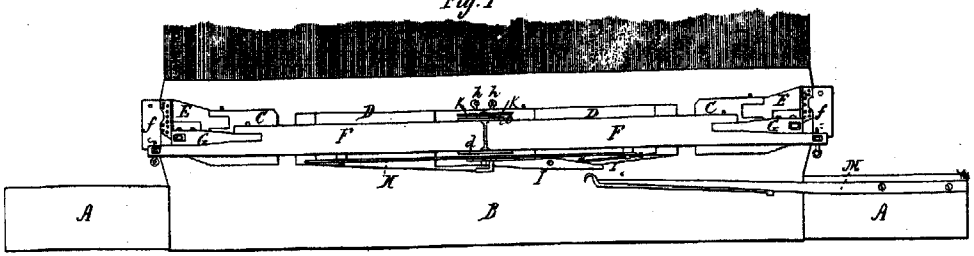
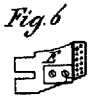
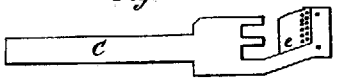
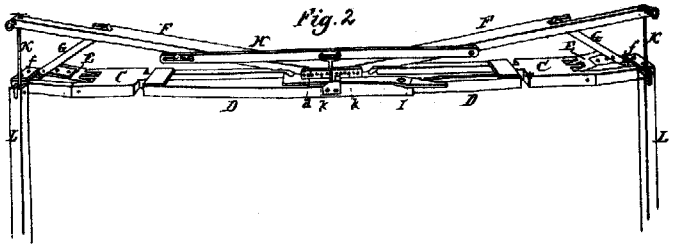
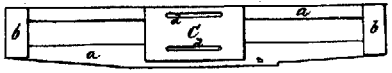
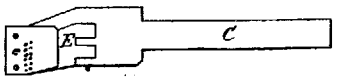
N. PETERS, PHOTO-LITHOGRAPHER, WASHINGTON, D. C.

3237[illegible]

References.

To John Buzin Jun.rs Temples, for Cloth Looms.

Patented 8th [illegible]

Fig. 1. Represents the temples on the cloth, as stretched out.

Fig. 2. The same in perspective, and open.

Fig. 3. The centre frame, marked D. in figures 1 & 2.

Fig. 4. Is the left hand slider, or temple end, drawn with the under side upwards to shew the plate c.

Fig. 5. Is the right hand slider; the jointed piece fig. 6. being left out. Both sliders are marked C. in figures 1 & 2.

Fig. 7. Represents part of the Loom, to shew how the temples are worked. A [illegible] in the loom, to work the temples. B. a Cam on the main shaft of the loom, to shut the temples. C. the sword or upright of the [illegible] is the block D. to work the lever E. and push forward the temples [illegible] -ever they open. F. weight to counterpoise the [illegible] of the levers E.